(12) United States Patent
Morihiro et al.

(10) Patent No.: US 10,003,978 B2
(45) Date of Patent: Jun. 19, 2018

(54) MOBILE COMMUNICATION SYSTEM, RADIO BASE STATION, RADIO MOBILE STATION AND MOBILE COMMUNICATION METHOD

(71) Applicant: NTT DOCOMO, INC., Tokyo (JP)

(72) Inventors: Yoshifumi Morihiro, Tokyo (JP); Satoshi Suyama, Tokyo (JP); Jiyun Shen, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days. days.

(21) Appl. No.: 15/102,883

(22) PCT Filed: Dec. 10, 2014

(86) PCT No.: PCT/JP2014/082719
§ 371 (c)(1),
(2) Date: Jun. 9, 2016

(87) PCT Pub. No.: WO2015/087924
PCT Pub. Date: Jun. 18, 2015

(65) Prior Publication Data
US 2016/0381568 A1    Dec. 29, 2016

(30) Foreign Application Priority Data

Dec. 10, 2013   (JP) ................................. 2013-255501

(51) Int. Cl.
*H04W 16/24*       (2009.01)
*H04W 36/00*       (2009.01)
(Continued)

(52) U.S. Cl.
CPC ........... *H04W 16/24* (2013.01); *H04W 36/00* (2013.01); *H04W 72/0406* (2013.01); *H04W 84/005* (2013.01)

(58) Field of Classification Search
CPC .......... H04W 84/005; H04W 72/0406; H04W 16/24; H04W 36/00; H04W 72/04;
(Continued)

(56) References Cited

U.S. PATENT DOCUMENTS

| 7,805,146 B1* | 9/2010 | Beyer, Jr. ................. G08G 3/00 455/456.1 |
| 2001/0005677 A1* | 6/2001 | Dempo ............. H04W 36/0055 455/436 |

(Continued)

FOREIGN PATENT DOCUMENTS

| JP | H11-239376 A | 8/1999 |
| JP | 2003-289283 A | 10/2003 |

(Continued)

OTHER PUBLICATIONS

International Search Report issued in corresponding application No. PCT/JP2014/082719 dated Mar. 17, 2015 (2 pages).

(Continued)

*Primary Examiner* — Meless Zewdu
(74) *Attorney, Agent, or Firm* — Osha Liang LLP

(57) ABSTRACT

A mobile communication system that includes a first communication system, which features a user terminal that is present in a moving object, a first radio base station that forms a cell in the moving object, and a first core network that is connected with an external network, and a second communication system, which features a radio mobile station that is provided in the moving object, a second radio base station that forms a cell on the path of the movement of the moving object, and a second core network that is connected with the second radio base station. The first radio base station and the radio mobile station are connected via a user-plane interface and a control-plane interface between the radio base stations and the core networks.

13 Claims, 11 Drawing Sheets

(51) Int. Cl.
*H04W 72/04* (2009.01)
*H04W 84/00* (2009.01)

(58) Field of Classification Search
CPC ..... H04W 28/08; H04W 36/22; H04W 28/12; H04W 72/00; H04W 84/00; H04W 84/10; H04W 88/00; H04W 88/14; H04W 88/16; H04W 92/00; H04W 92/04; H04W 92/16; H04W 84/22; H04W 88/08; H04W 88/18; H04W 92/10; H04W 16/20; H04W 80/02
See application file for complete search history.

(56) References Cited

U.S. PATENT DOCUMENTS

| | | | | |
|---|---|---|---|---|
| 2006/0229103 | A1* | 10/2006 | Monk | H04B 7/18506 455/562.1 |
| 2009/0180414 | A1* | 7/2009 | Maeda | H04B 7/2643 370/311 |
| 2009/0219900 | A1* | 9/2009 | Kokkinen | B61L 15/0027 370/338 |
| 2010/0128668 | A1* | 5/2010 | Lu | H04J 13/00 370/328 |
| 2010/0136987 | A1* | 6/2010 | Kim | H04W 28/16 455/450 |
| 2011/0038276 | A1 | 2/2011 | Ninagawa | |
| 2011/0092237 | A1* | 4/2011 | Kato | H04W 64/003 455/507 |
| 2012/0058763 | A1* | 3/2012 | Zhao | H04W 48/20 455/434 |
| 2013/0084868 | A1* | 4/2013 | Song | H04W 36/0055 455/436 |
| 2013/0163508 | A1* | 6/2013 | Yu | H04W 16/14 370/315 |
| 2013/0244569 | A1* | 9/2013 | Dunn | H04W 36/0061 455/11.1 |
| 2014/0036722 | A1* | 2/2014 | Giloh | H04L 12/4633 370/254 |
| 2014/0192781 | A1* | 7/2014 | Teyeb | H04W 36/34 370/331 |
| 2014/0204832 | A1* | 7/2014 | Van Phan | H04W 88/10 370/315 |
| 2014/0226559 | A1* | 8/2014 | Jactat | H04W 36/0055 370/315 |
| 2014/0241297 | A1* | 8/2014 | Park | H04W 74/0833 370/329 |
| 2014/0247807 | A1* | 9/2014 | Westerberg | H04W 36/34 370/331 |
| 2015/0065146 | A1* | 3/2015 | Wenger | H04W 36/32 455/440 |
| 2015/0312832 | A1* | 10/2015 | Huang | H04W 36/0055 370/338 |
| 2015/0334611 | A1* | 11/2015 | Kim | H04W 36/0083 370/331 |
| 2016/0249233 | A1* | 8/2016 | Murray | B61L 27/0005 |

FOREIGN PATENT DOCUMENTS

JP 2011-176874 A 9/2011
WO 2012/171585 A1 12/2012

OTHER PUBLICATIONS

Written Opinion of the International Searching Authority issued in corresponding application No. PCT/JP2014/082719 dated Mar. 17, 2015 (4 pages).
3GPP TS 36.300 V10.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Dec. 2010 (200 pages).
Extended European Search Report dated Jun. 12, 2017, in corresponding European Patent Application No. 4868943.3 (11 pages).
Office Action issued in the counterpart Japanese Patent Application No. 2013-255501, dated Sep. 26, 2017 (6 pages).

* cited by examiner

MOBILE COMMUNICATION SYSTEM, RADIO BASE STATION, RADIO MOBILE STATION AND MOBILE COMMUNICATION METHOD

TECHNICAL FIELD

The present invention relates to mobile communication (group mobility (GM)) by user terminals that are present in a moving object.

BACKGROUND ART

In LTE (Long Term Evolution) and successor mobile communication systems of LTE (referred to as, for example, "LTE-Advanced," "FRA (Future Radio Access)," "4G," etc.), a user terminal (UE: User Equipment) transmits and receives user data (user ("U")-plane) and control signals (control ("C")-plane) to and from a core network ("CN," also referred to as "EPC" (Evolved Packet Core) and so on) via a radio base station (eNB: eNodeB) (see, for example, non-patent literature 1).

As shown in FIG. 1, in the user plane, a user terminal, a radio base station and a device on the core network (for example, a serving gateway (S-GW), a packet data network gateway (P-GW (Packet data network GateWay)/PDN-GW), etc.) transmit and receive user data. Also, in the control-plane, a user terminal, a radio base station and a device on the core network (for example, the above-noted S-GW, P-GW, a mobility management entity (MME), etc.) transmit and receive control signals.

CITATION LIST

Non-Patent Literature

Non-Patent Literature 1:3GPP TS 36.300 V10.2.0, "Evolved Universal Terrestrial Radio Access (E-UTRA) and Evolved Universal Terrestrial Radio Access Network (E-UTRAN); Overall Description"

SUMMARY OF THE INVENTION

Technical Problem

In the above mobile communication system, when many user terminals (UE: User Equipment) that are present in the same moving object (for example, a train, a bus, a ship, and/or the like) carry out mobile communication (group mobility (GM)), each user terminal separately connects with a radio base station and communicates, and therefore there is a threat that the system performance is deteriorated due to the control overhead and the concentration of traffic.

For example, as shown in FIG. 2, when a moving object moves from a cell 1 (macro cell) to a cell 2 (macro cell), many user terminals in this moving object make a handover from a radio base station 1 to a radio base station 2 all at once. Therefore, there is a threat that a deterioration of system performance might result from increased overhead of control signals, concentrated traffic in radio base stations 1 and 2 and so on.

The present invention has been made in view of the above, and it is therefore an object of the present invention to provide a mobile communication system, a radio base station, a radio mobile station and a mobile communication method that can improve system performance when user terminals that are present in a moving object perform mobile communication.

Solution to Problem

The mobile communication system of the present invention provides a mobile communication system having a first communication system, which includes a user terminal that is present in a moving object, a first radio base station that forms a cell in the moving object, and a first core network that is connected to an external network, and a second communication system, which includes a radio mobile station that is provided in the moving object, a second radio base station that forms a cell on a path of movement of the moving object, and a second core network that is connected to the second radio base station, and, in this mobile communication system, the first radio base station and the radio mobile station are connected via a user-plane interface and a control-plane interface between the radio base stations and the core networks.

Technical Advantage of the Invention

According to the present invention, system performance can be improved when user terminals that are present in a moving object perform mobile communication.

DESCRIPTION OF EMBODIMENTS

Figure 1:
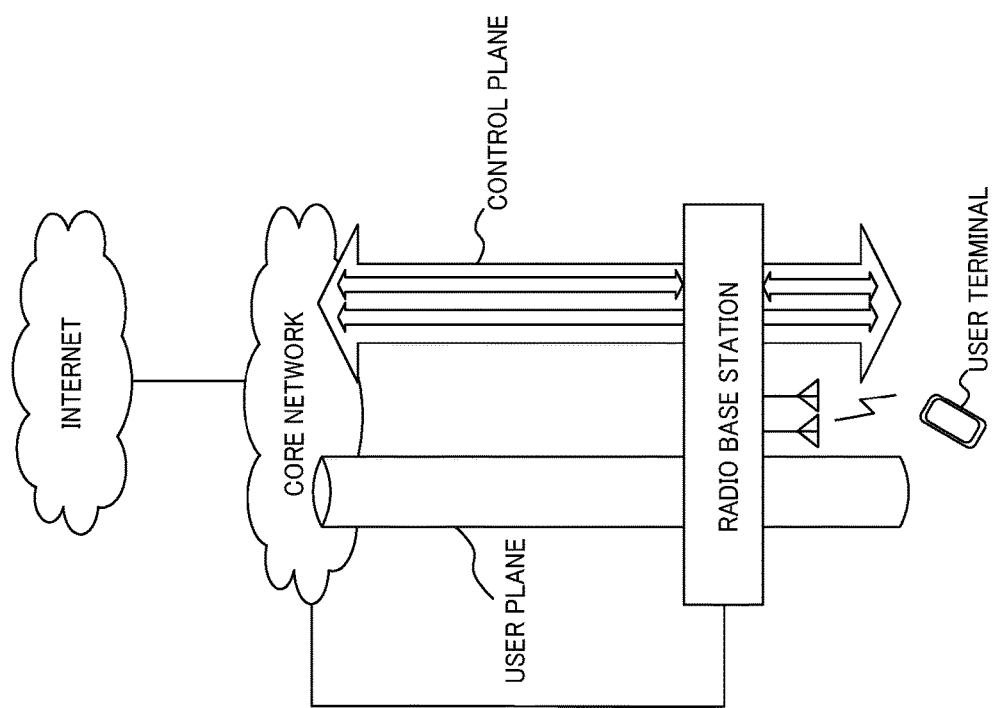
FIG. 1 is a diagram to explain user/control-planes in conventional mobile communication systems.
Figure 2:
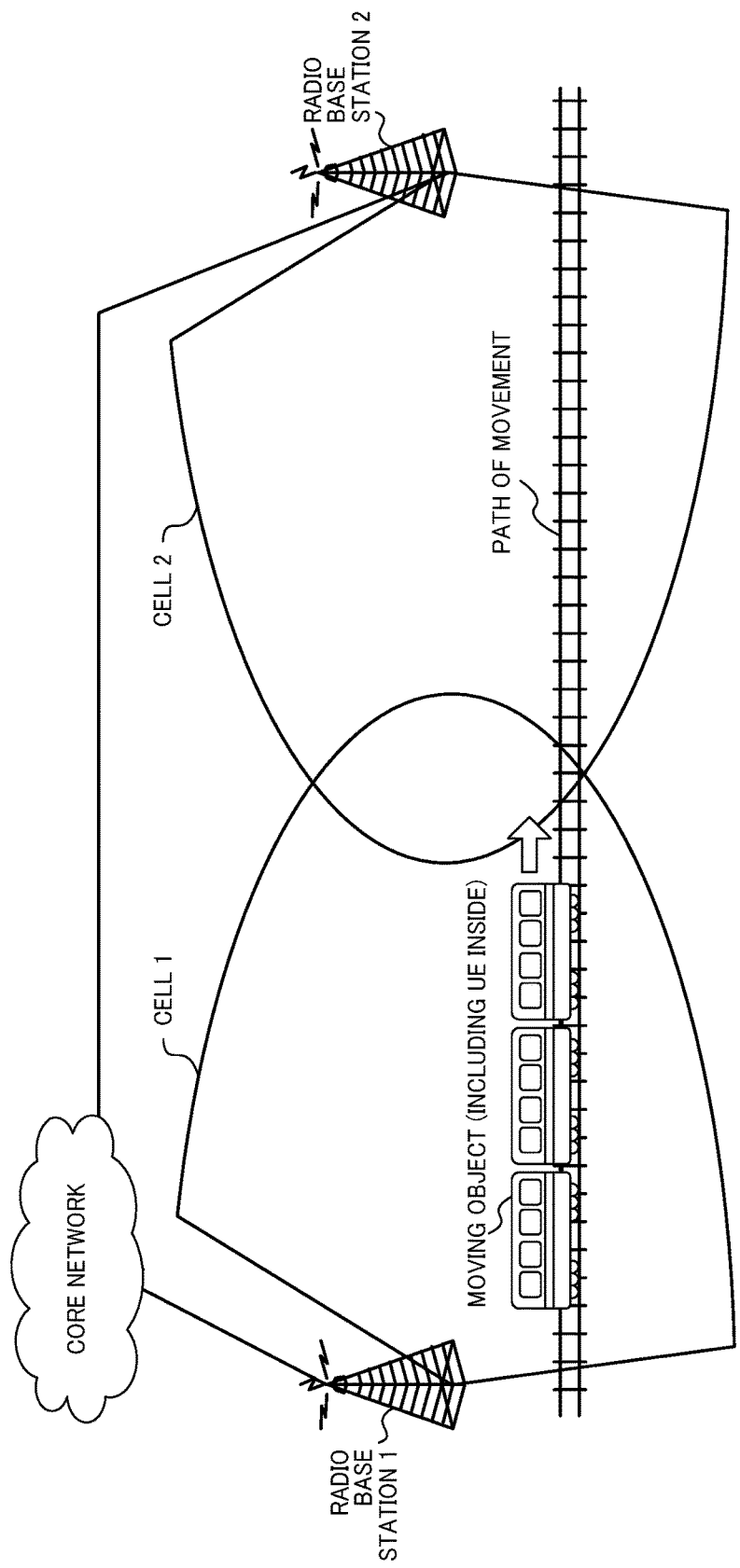
FIG. 2 is a diagram to show an example of a conventional mobile communication system.
Figure 3:
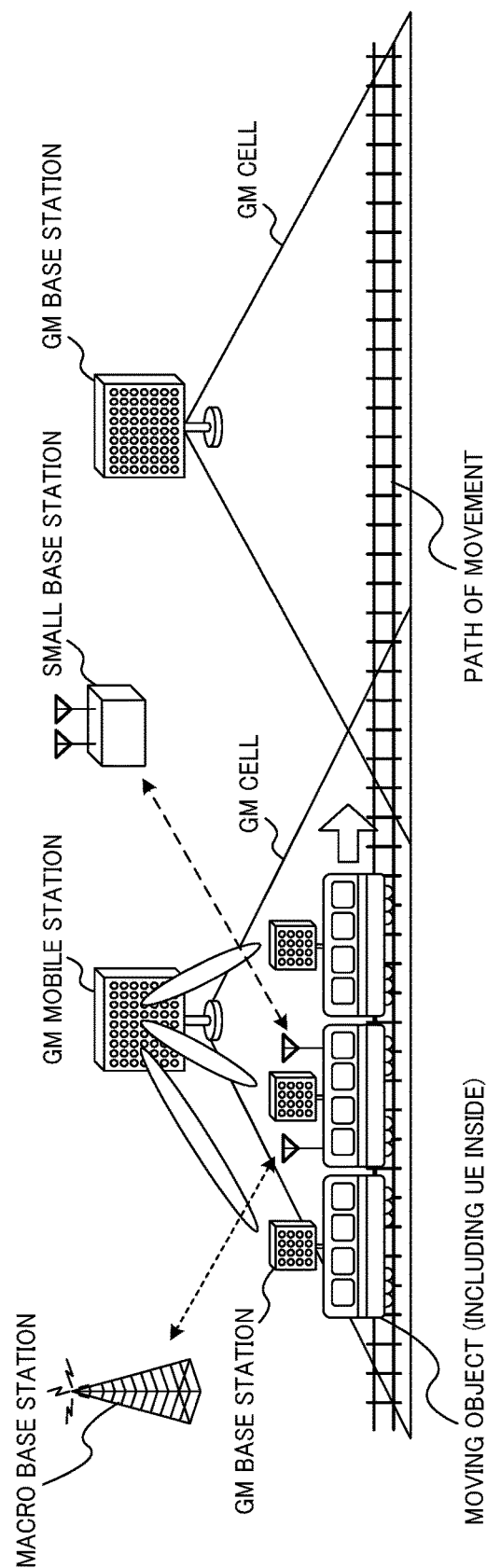
FIG. 3 is a conceptual diagram of group mobility.

FIG. 3 is a conceptual diagram of a group mobility (GM) system in which many user terminals that are present in a moving object carry out mobile communication. As shown in FIG. 3, the GM system is formed by including radio base stations (hereinafter referred to as "GM base stations") that are placed along the path of the movement of a moving object, and mobile stations (hereinafter referred to as "GM mobile stations") that are placed on the moving object.

The GM base stations form cells (hereinafter referred to as "GM cells," but may be also referred to as "moving cells" and/or the like) that cover the path of movement. In the GM cells, frequency bands that are different from those of cells with relatively large coverage (hereinafter referred to as "macro cells") and cells with relatively small coverage (hereinafter referred to as "small cells") (for example, SHF (Super High Frequency) bands and EHF (Extremely High Frequency) bands) may be used. The use of different frequency bands makes it possible to reduce the load on existing macro cells and small cells, and prevent concentration of traffic.

The GM mobile stations are placed in the moving object and communicate with the GM base stations. The GM mobile stations make a handover between the GM base stations in GM cell edges. Note that the GM mobile stations can also communicate with radio base stations that form macro cells (macro base stations) and radio base stations that form small cells (small base stations).

In the GM system, the GM base stations and the GM mobile stations may each communicate using beams that are formed by using a plurality of antenna elements (beamforming). Beamforming makes it possible to follow relative location changes accompanying the movement of the object, and achieve stable communication quality. In particular, the quality of communication can be further improved by using beamforming (massive MIMO structure) of high reliability that uses a large number of (for example, 1024) antenna elements.

Now, to allow a user terminal in the moving object to communicate by using the GM system, it is necessary to provide a device for relaying communication between the user terminal and a GM mobile station in the moving object. For such a device, for example, a radio base station (hereinafter referred to as "intra-moving object base station") to form a cell (small cell) of a cellular scheme (for example, LTE, LTE-A, FRA, etc.), and an access point (AP) to form a Wi-Fi spot of a Wi-Fi scheme may be possible.

When an intra-moving object base station of a cellular scheme is provided, in what configuration the intra-moving object and are GM mobile station are connected is the problem. So, the present inventors have come up with the idea of improving system performance when many user terminals in a moving object perform mobile communication, by adequately connecting between intra-moving object base stations and GM mobile stations, and thereupon arrived at the present invention.

Now, a mobile communication system according to the present embodiment will be described in detail below. Note that, in the mobile communication system according to the present embodiment, the moving object in which many user terminals can be placed may be, for example, a train, a bus, a ship and/or the like, and can be any object as long as it moves along a predetermined path. A case will be described below as an example in which the moving object is a train.

(First Embodiment)

The mobile communication system according to the first embodiment will be described with reference to FIGS. 4 to 7. In the mobile communication system according to the first embodiment, an intra-moving object base station and a GM mobile station are connected with interfaces between radio base stations and core networks, thereby allowing the GM mobile station to function as a backhaul entrance for the intra-moving object base station.

Here, the interfaces between radio base stations and core networks include a user-plane interface and a control-plane interface. The user-plane interface between radio base stations and core networks is, for example, the S1-U interface, but is by no means limited to this. Also, the control-plane interface between radio base stations and core networks is, for example, the S1-MME (also referred to as "S1-C") interface, but is by no means limited to this.

(1.1) Structure of Mobile Communication System 1

Figure 4:
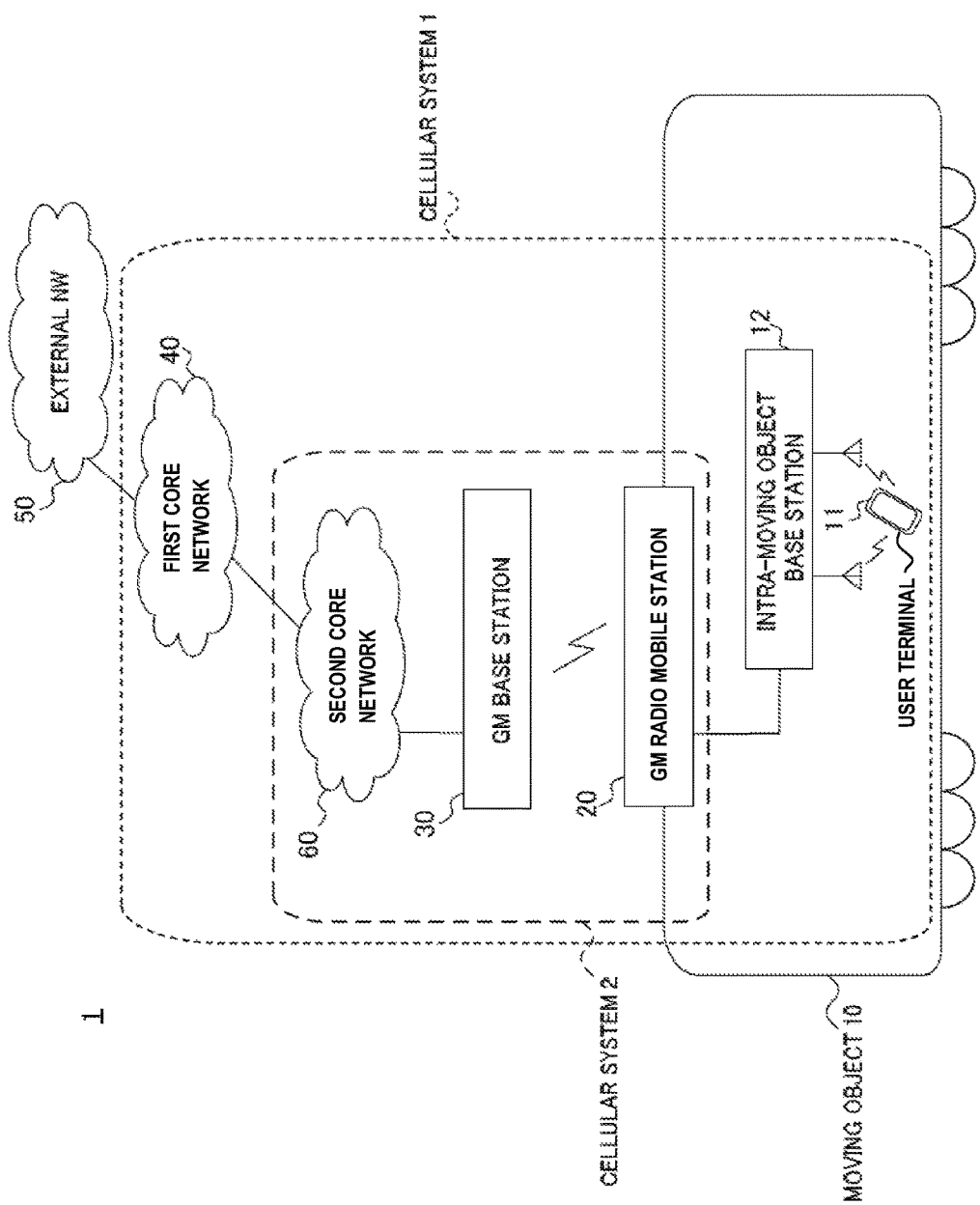
FIG. 4 is a diagram to show an overall structure of a mobile communication system according to a first embodiment.

FIG. 4 is a schematic diagram of a mobile communication system according to a first embodiment. As shown in FIG. 4, a mobile communication system 1 includes a radio mobile station (hereinafter referred to as "GM mobile station") 20 that is provided in a moving object 10, a radio base station (hereinafter referred to as "GM base station") 30 (second radio base station) that is placed along the path of the movement of the moving object 10, a core network (CN) 40 (first core network) that is connected to an external network (NW) 50 such as the Internet, and a core network (CN) 60 (second core network) that is connected to the GM base station 30 and the CN 40.

Also, in the moving object 10, a user terminal 11 and a radio base station that forms a cell C (small cell) (hereinafter referred to as "intra-moving object base station") 12 (first radio base station) are provided. Note that the user terminal 11 is a terminal to support various communication schemes such as LTE, LTE-A, FRA, etc.

Also, the mobile communication system 1 is formed by including a cellular system 1 (first communication system) accommodating the user terminal 11, the intra-moving object base station 12 and the CN 40, and a cellular system 2 (second communication system) accommodating the GM mobile station 20, the GM base station 30 and the CN 60. As shown in FIG. 4, the cellular system 2 is provided as an inner system (backhaul system) of the cellular system 1. Consequently, between the intra-moving object base station 12, which serves as the connecting point of the cellular system 1 and the cellular system 2, and the GM mobile station 20, user/control-plane interfaces (for example, the S1-U/S1-MME interfaces) between radio base stations and core networks are used. Similarly, between the CN 40 and the CN 60, user/control-plane interfaces (for example, the S1-U/S1-MME interfaces) between radio base stations and core networks are used.

In the mobile communication system 1, the user terminal 11 connects with (serves) the intra-moving object base station 12, which moves with the moving object 10. Consequently, unlike when the user terminal 11 directly connects with (serves) a macro base station (see FIG. 3), a handover is not repeated accompanying the movement of the moving object 10. Therefore, even when many user terminals 11 in the moving object 10 perform mobile communication, it is still possible to reduce the control overhead due to handovers and the concentration of traffic, and improve the system performance.

(1.2) User/Control-Plane Communication Process

Figure 5:
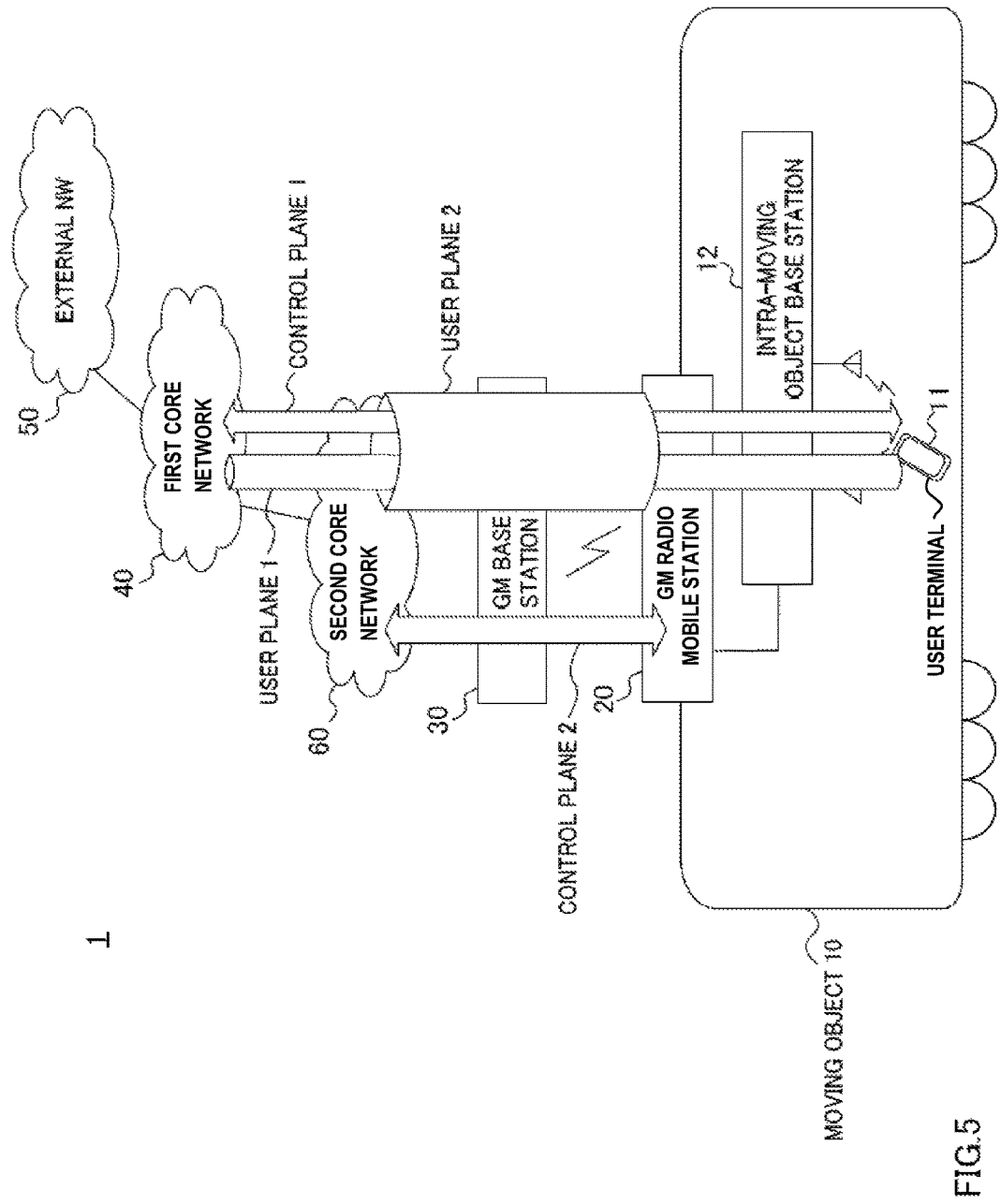
FIG. 5 is a diagram to explain the user/control-planes in the mobile communication system according to the first embodiment.

Communication using the user plane and the control plane in the mobile communication system according to the first embodiment will be described with reference to FIGS. 5 and 6. FIG. 5 is a diagram to explain the user/control planes in the mobile communication system according to the first embodiment. As shown in FIG. 5, in the mobile communication system 1, communication using a user plane 1 and communication using a control plane 1 are carried out between the user terminal 11 and the CN 40.

To be more specific, in the user plane 1, uplink user data is transmitted from the user terminal 11 to the CN 40 via the intra-moving object base station 12. Downlink user data from the external NW 50 is transmitted from the CN 40 to the user terminal 11 via the intra-moving object base station 12.

In the control plane 1, control signals are transmitted and received between the user terminal 11 and the CN 40, between the user terminal 11 and the intra-moving object base station 12 and between the intra-moving object base station 12 and the CN 40. Note that the control signals (uplink/downlink control signals) include signals for use for the mobility control, initial access authentication control and so on of the user terminal 11.

In the mobile communication system 1, communication using the user plane 2 and communication using the control plane 2 are carried out between the GM mobile station 20 and the CN 60.

To be more specific, in the user plane 2, the GM mobile station 20 transmits uplink user data and uplink control signals of lower layers (for example, L1 and L2 layers), received from the intra-moving object base station 12, to the CN 60 as uplink user data. The CN 60 transmits both the uplink user data and the uplink control signals (lower layer data) of lower layers (for example, L1 and L2 layers) to the CN 40.

In the user plane 2, the CN 60 transmits downlink user data and downlink control signals of lower layers (for example, L1 and L2 layers), received from the CN 40, to the GM mobile station 20 as downlink user data. The GM mobile station 20 transmits both the downlink user data and the downlink control signals (lower layer data) of lower layers (for example, L1 and L2 layers) to the intra-moving object base station 12.

In the control plane 2, control signals are transmitted and received between the GM mobile station 20 and the CN 60, between the GM mobile station 20 and the GM base station 30 and between the GM base station 30 and the CN 60.

Figures 6A, 6B:
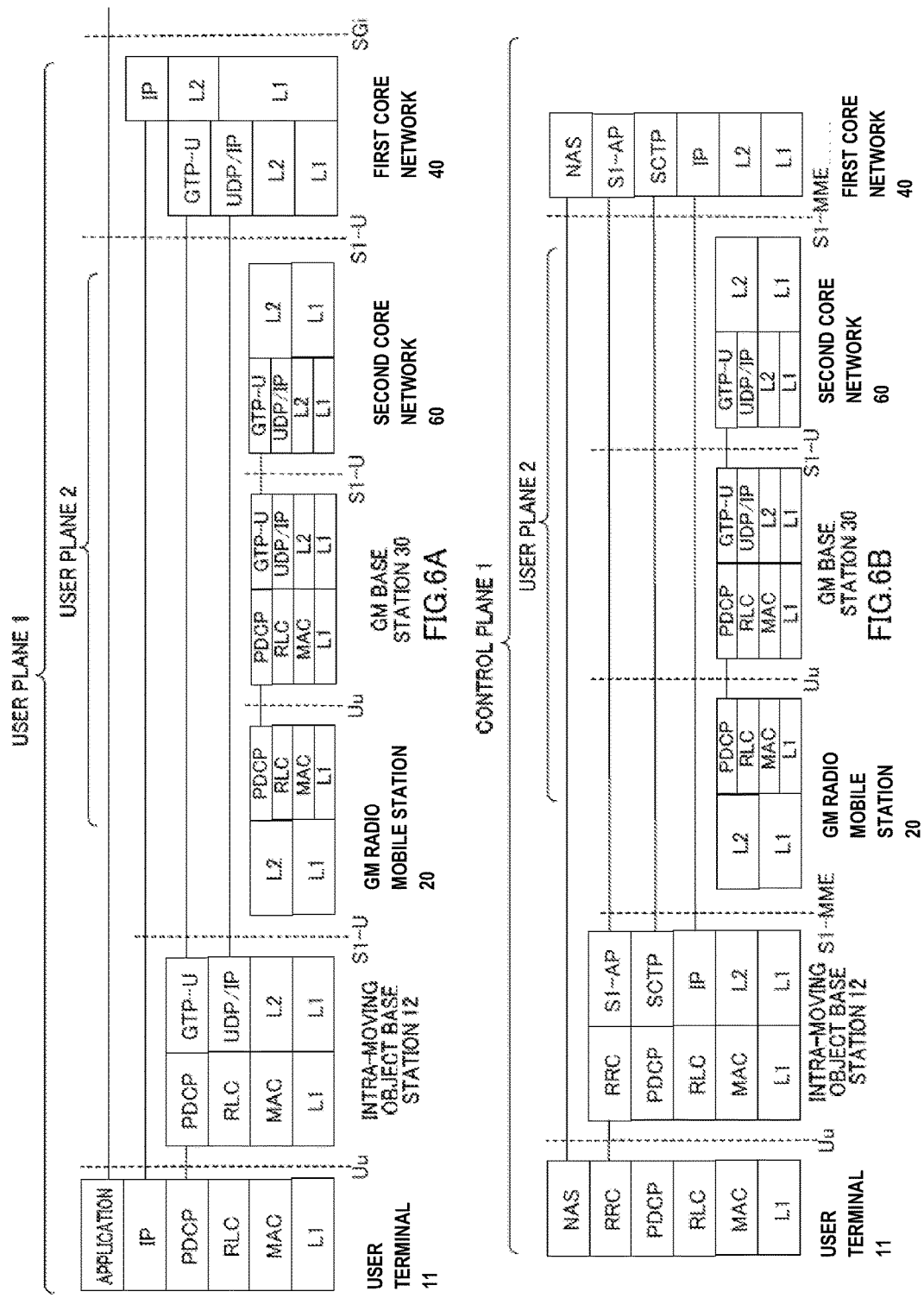
FIG. 6 provide diagrams to explain the protocol stacks in the mobile communication system according to the first embodiment.

FIG. 6 provide diagrams to show examples of protocol stacks in the mobile communication system according to the first embodiment. FIG. 6A shows user-plane protocol stacks, and FIG. 6B shows control-plane protocol stacks. Note that the protocol stacks of FIGS. 6A and 6B are simply examples, and these are by no means limiting.

As shown in FIG. 6A, in the user plane, the user terminal 11 and the intra-moving object base station 12 transmit and receive user data, by using L1 (layer 1/physical layer), MAC (Medium Access Control), RLC (Radio Link Control) and PDCP, via a radio interface (referred to as "Uu interface" and so on). The intra-moving object base station 12 converts the L1, MAC, RLC and PDCP data into L1, L2, UDP (User Datagram Protocol)/IP (Internet Protocol) and GTP-U (GPRS Tunneling Protocol for the User Plane) data.

The intra-moving object base station 12 and the CN 40 transmit and receive user data by using GTP-U and UDP/IP via the user-plane interface (referred to as the "S1-U interface" and so on) between the radio base stations and the core networks.

Although not illustrated, a plurality of gateway devices (for example, an S-GW and a P-GW) are provided in the CN 40. Communication using L1, L2, UDP/IP and GTP-U may be carried out between the S-GW and the P-GW (in the case of GTP S5/S8), and communication using L1, L2, IPv4/v6 (Internet Protocol version 4/version 6) and the GRE (Generic Routing Encapsulation) tunnel may be carried out between the S-GW and the P-GW (in the case of PMIP (Proxy Mobile IP) S5/S8).

The gateway device (for example, the P-GW) of the CN 40 converts the L1, L2, UDP/IP and GTP-U data of the user plane 1 into L1, L2 and IP data (in the event of GTP S5/S8). This gateway device may convert the L1, L2, IPv4/v6, the GRE tunnel, IP data of the user plane 1 into L1, L2 and IP data (in the event of PMIP S5/S8).

The intra-moving object base station 12 and the GM mobile station 20 transmit and receive user data, by using L1 and L2, via the user-plane interface (referred to as the "S1-U interface" and so on) between the radio base stations and the core networks. The GM mobile station 20 converts the L1 and L2 data of the user plane 1 into L1, MAC, RLC and PDCP data of the user plane 2.

The GM mobile station 20 and the GM base station 30 transmit and receive user data by using L1, MAC, RLC and PDCP via the radio interface (referred to as "Uu interface" and so on). The GM base station 30 converts the L1, MAC, RLC, PDCP and IP data of the user plane 2 into L1, L2, UDP/IP and GTP-U data of the user plane 2.

The GM base station 30 and the CN 60 transmit and receive user data by using L1, L2, UDP/IP and GTP-U via the user-plane interface (referred to as the "S1-U interface" and so on) between the radio base stations and the core networks.

Note that, although not illustrated, a plurality of gateway devices (for example, an S-GW and a P-GW) are provided in the CN 60. Communication using L1, L2, UDP/IP and GTP-U may be carried out between the S-GW and the P-GW (in the event of GTP S5/S8), or communication using L1, L2, IPv4/v6 and the GRE tunnel may be carried out between the S-GW and the P-GW (in the event of PMIP S5/S8).

The gateway device (for example, the P-GW) of the CN 60 converts L1, L2, UDP/IP and GTP-U data of the user plane 2 into L1 and L2 data of the user plane 1 (in the event of GTP S5/S8). This gateway device may convert the L1, L2, IPv4/v6 and GRE-tunnel data of the user plane 2 into L1 and L2 data of the user plane 1 (in the event of PMIP S5/S8).

The CN 60 and the CN 40 transmit and receive user data by using L1 and L2 via the user-plane interface (referred to as the "S1-U interface" and so on) between the radio base stations and the core networks.

The CN 40 and the external NW 50 transmit and receive user data by using L1, L2 and IP, via the interface (referred to as "SGi interface" and so on) with the external NW.

As shown in FIG. 6B, in the control plane, the user terminal 11 and the intra-moving object base station 12 transmit and receive control signals, by using L1, MAC, RLC, PDCP and RRC (Radio Resource Control), via the radio interface (referred to as "Uu interface" and so on). The intra-moving object base station 12 converts the L1, MAC, RLC, PDCP and RRC data of the control plane 1 into L1, L2, IP, SCTP (Stream Control Transmission Protocol) and S1-AP data.

The intra-moving object base station 12 and the CN 40 transmit and receive control signals by using IP, SCTP and S1-AP via the control-plane interface (referred to as the "S1-MME interface" and so on) between the radio base stations and the core networks. Also, the UE 11 and the CN 40 transmit and receive control signals by using NAS.

The intra-moving object base station 12 and the GM mobile station 20 transmit and receive control signals by using L1 and L2 via the control-plane interface (referred to as the "S1-MME interface" and so on) between the radio base stations and the core networks. The GM mobile station 20 converts the L1 and L2 data of the control plane 1 into L1, MAC, RLC and PDCP data of the user plane 2.

The user plane 2 communication process between the GM mobile station 20 and the GM base station 30 and the user plane 2 communication process between the GM base station 30 and the CN 60 have been described with reference to FIG. 6A. The gateway device of the CN 60 (for example, a P-GW) converts L1, L2, UDP/IP and GTP-U data of the user plane 2 into L1 and L2 data of the control plane 1.

(1.3) Structure of Each Device

Figure 7:
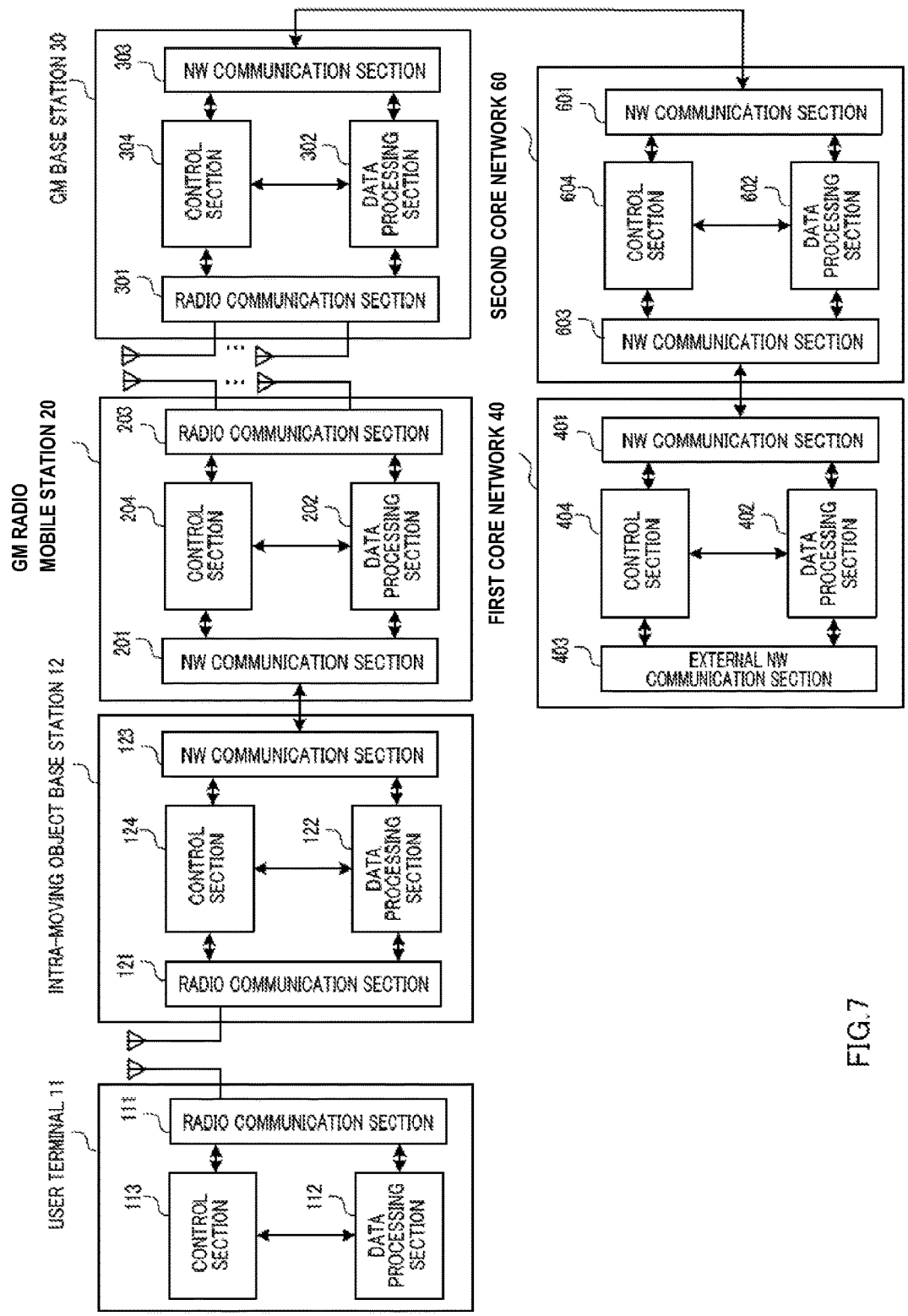
FIG. 7 is a diagram to show a detailed structure of the mobile communication system according to the first embodiment.

The structure of each device in the mobile communication system according to the first embodiment will be described with reference to FIG. 7. FIG. 7 is a diagram to show the structure of each device in the mobile communication system according to the first embodiment. Note that each device shown FIG. 7 has hardware including a processor, a memory, an RF (Radio Frequency) circuit, an antenna, a display, a user interface, and a software module to be executed by the processor is stored in the memory. Each device structure may be implemented by the above-noted hardware, may be implemented by the software module that is executed by the processor, or may be implemented by the combination of both.

(1.3.1) Structure of User Terminal 11

As shown in FIG. 7, the user terminal 11 has a radio communication section 111, a data processing section 112 and a control section 113.

The radio communication section 111 transmits and receives user data of the user plane 1 and control signals of the control plane 1 with the intra-moving object base station 12 via a radio interface (for example, the Uu interface). For example, the radio communication section 111 may carry out communication using L1 (FIGS. 6A and 6B). Note that the radio communication section 111 may carry out radio communication with macro base stations and small base stations provided outside the moving object 10.

The data processing section 112 performs data processing of the radio interface (for example, the Uu interface). For example, the data processing section 112 may process MAC, RLC, PDCP, IP and application protocol data (see FIG. 6A). Also, the data processing section 112 may process MAC, RLC, PDCP, RRC and NAS (Non-Access Stratum) data (see FIG. 6B).

The control section 113 controls the radio communication section 111 and the data processing section 112. Also, the control section 113 may execute RRC control with respect to the intra-moving object base station 12, or execute NAS control with respect to the CN 40.

(1.3.2) Structure of Intra-Moving Object Base Station 12

As shown in FIG. 7, the intra-moving object base station 12 has a radio communication section 121, a data processing section 122, a network (NW) communication section 123 and a control section 124.

The radio communication section 121 transmits and receives user data of the user plane 1, control signals of the user plane 1 and so on, with the user terminal 11, via a radio interface (for example, the Uu interface). For example, the radio communication section 121 may communicate by using L1 (FIGS. 6A and 6B).

The data processing section 122 performs data processing of the radio interface (for example, the Uu interface) and the user/control-plane interfaces (for example, the S1-U/S1-MME interfaces) between the radio base stations and the core networks. For example, the data processing section 122 may perform the conversion process of MAC, RLC and PDCP user data and L1, L2, UDP/IP and GTP-U user data (see FIG. 6A). The data processing section 122 may perform the conversion process of MAC, RLC, PDCP and RRC control signals and L2, IP, SCTP and S1-AP control signals (see FIG. 6B).

The NW communication section 123 transmits and receives user data of the user plane 1, control signals of the control plane 1 and so on, with the GM mobile station 20, via the user/control-plane interfaces (for example, the S1-U/S1-MME interfaces) between the radio base stations and the core networks.

The control section 124 controls the radio communication section 121, the data processing section 122 and the NW communication section 123. The control section 124 may execute RRC control with respect to the user terminal 11, or execute S1-AP control with respect to the CN 40. In this case, RRC and S1-AP need not be subjected to conversion in the data processing section 122.

(1.3.3) Structure of GM Mobile Station 20

As shown in FIG. 7, the GM mobile station 20 has a network (NW) communication section 201, a data processing section 202, a radio communication section 203 and a control section 204.

The NW communication section 201 transmits and receives user data of the user plane 1, control signals of the control plane 1 and so on, with the intra-moving object base station 12, via the user/control-plane interfaces (for example, the S1-U/S1-MME interfaces) between the radio base stations and the core networks. For example, the NW communication section 201 may communicate by using L1 and L2 (FIGS. 6A and 6B).

The data processing section 202 performs data processing of the radio interface (for example, the Uu interface), the user/control-plane interfaces (for example, the S1-U/S1-MME interfaces) between the radio base stations and the core networks. For example, the data processing section 202 may convert lower layer (L1 and L2) user data of the user plane 1 and lower layer (L1 and L2) control signals of the control plane 1 into L1, MAC, RLC, PDCP and IP user data of the user plane 2 (see FIGS. 6A and 6B).

The radio communication section 203 transmits and receives user data and control signals with the GM base station 30 via a radio interface (for example, the Uu interface). To be more specific, the radio communication section 203 transmits and receives user data of the user plane 2 and control signals of the control plane 2 with the GM base station 30. For example, the radio communication section 203 may communicate by using L1 (FIGS. 6A and 6B).

The radio communication section 203 may carry out radio communication with the GM base station 30 by using beamforming. When the radio communication section 203 holds many antenna elements, it is possible to execute even more reliable beamforming with massive MIMO. By means of beamforming, it is possible to improve the quality of communication between the GM mobile station 20 and the GM base station 30.

The control section 204 controls the NW communication section 201, the data processing section 202 and the radio communication section 203. Also, the control section 204 may execute NAS control with respect to the CN 60, or execute RRC control with respect to the GM base station 30.

(1.3.4) Structure of GM Base Station 30

As shown in FIG. 7, the GM base station 30 has a radio communication section 301, a data processing section 302, a network (NW) communication section 303 and a control section 304.

The radio communication section 301 transmits and receives user data of the user plane 2 and control signals of the control plane 2 with the GM mobile station 20 via a radio interface (for example, the Uu interface). For example, the radio communication section 301 may communicate by using L1 (FIGS. 6A and 6B).

The radio communication section 301 may carry out radio communication with the GM mobile station 20 by using beamforming. When the radio communication section 301 holds many antenna elements, it is possible to execute even more reliable beamforming with massive MIMO. By means of beamforming, it is possible to improve the quality of communication between the GM mobile station 20 and the GM base station 30.

The data processing section 302 performs data processing of the radio interface (for example, the Uu interface) and the user/control-plane interfaces (for example, the S1-U/S1-MME interfaces) between the radio base stations and the core networks. For example, the data processing section 302 may perform the conversion process of MAC, RLC and PDCP data and L2, UDP/IP and GTP-U data (see FIGS. 6A and 6B).

The NW communication section 303 transmits and receives user data of the user plane 2 and control signals of the control plane 2 with the CN 60 via the user/control-plane interfaces (for example, the S1-U/S1-MME interfaces) between the radio base stations and the core networks.

The control section 304 controls a radio communication section 301, a data processing section 302 and a NW communication section 303. Also, the control section 304 may execute RRC control with respect to the GM mobile station 20 or execute S1-AP control with respect to the CN 60.

(1.3.5) Structure of CN 60

As shown in FIG. 7, the CN 60 has a network (NW) communication section 601, a data processing section 602, a network (NW) communication section 603 and a control section 604. Note that the following structure of the CN 60 has only to be constituted with at least one of the S-GW, the P-GW and the MME that are provided in the CN 60.

The NW communication section 601 transmits and receives user data of the user plane 2 and control signals of the control plane 2 with the GM base station 30 via the user/control-plane interfaces (for example, the S1-U/S1-MME interfaces) between the radio base stations and the core networks.

The data processing section 602 performs data processing of the user/control-plane interfaces (for example, the S1-U/S1-MME interfaces) between the radio base stations and the core networks, and the interface (for example, the SGi interface) with the external network. For example, the data processing section 602 converts L1, L2, UDP/IP and GTP-U user data of the user plane 2 into user data of lower layers (L1 and L2) of the user plane 1 and control signals of lower layers (L1 and L2) of the user plane 1 (see FIGS. 6A and 6B).

The NW communication section 603 transmits and receives user data of the user plane 1, control signals of the control plane 1 and so on with the CN 40 via the user/control-plane interfaces (for example, the S1-U/S1-MME interfaces) between the radio base stations and the core networks. For example, the NW communication section 603 may communicate by using L1 and L2 (FIGS. 6A and 6B).

The control section 604 controls the NW communication section 601, the data processing section 602 and the NW communication section 603. Also, the control section 604 may execute NAS control with respect to the GM mobile station 20, or execute S1-AP control with respect to the GM base station 30.

(1.3.6) Structure of CN 40

As shown in FIG. 7, the CN 40 has a network (NW) communication section 401, a data processing section 402, an external network (NW) communication section 403 and a control section 404. Note that the following structure of the CN 40 has only to be constituted with at least one of the S-GW, the P-GW and the MME that are provided in the CN 40.

The NW communication section 401 transmits and receives user data of the user plane 1 and control signals of the control plane 1 and so on with the CN 60 via the user/control-plane interfaces (for example, the S1-U/S1-MME interfaces) between the radio base stations and the core networks. For example, the NW communication section 401 may communicate by using L1 and L2 (FIGS. 6A and 6B).

The data processing section 402 performs data processing of the user/control-plane interfaces (for example, the S1-U/S1-MME interfaces) between the radio base stations and the core networks, and the interface (for example, the SGi interface) with the external network. For example, the data processing section 402 performs the conversion process of L1, L2, UDP/IP and GTP-U data of the user plane 1, and L1, L2 and IP data (see FIG. 6A). The data processing section 402 may process L1, L2, IP, SCTP, S1-AP and NAS data of the control plane 1 (see FIG. 6B).

The external NW communication section 403 transmits and receives L1, L2 and IP data with the external NW 50 via the interface (for example, the SGi interface) with the external NW 50.

The control section 404 controls the NW communication section 401, the data processing section 402 and the external NW communication section 403. Also, the control section 404 may execute NAS control with respect to the user terminal 11 or execute S1-AP control with respect to the intra-moving object base station 12.

(1.4) Working Effect

As described above, in the mobile communication system according to the first embodiment, a cellular system 2 is provided as an internal system (backhaul system) of the cellular systems 1 (see FIG. 4). The intra-moving object base station 12, which serves as the connecting point between the cellular system 1 and the cellular system, and the GM mobile station 20 are connected with the user/control-plane interfaces (for example, the S1-U/S1-MME interfaces) between the radio base stations and the core networks.

By this means, the user terminal 11 connects with (serves) the intra-moving object base station 12 that moves with the moving object 10. Consequently, unlike when the user terminal 11 directly connects with (serves) a macro base station (see FIG. 3), a handover is not repeated accompanying the movement of the moving object 10. Therefore, even when many user terminals 11 in the moving object 10 perform mobile communication, it is still possible to reduce the control overhead due to handovers and the concentration of traffic, and improve the system performance.

(Second Embodiment)

A mobile communication system according to a second embodiment will be described with reference to FIGS. 8 to 11. In the mobile communication system according to the second embodiment, an intra-moving object base station and a GM mobile station are connected with interfaces between core networks and an external network, thereby allowing the GM mobile station to function as a relay device between an extra-moving object cellular system and an intra-moving object cellular system.

Here, the interfaces between core networks and an external network is, for example, the SGi interface, but are by no means limited to this.

(2.1) Structure of Mobile Communication System

Figure 8:
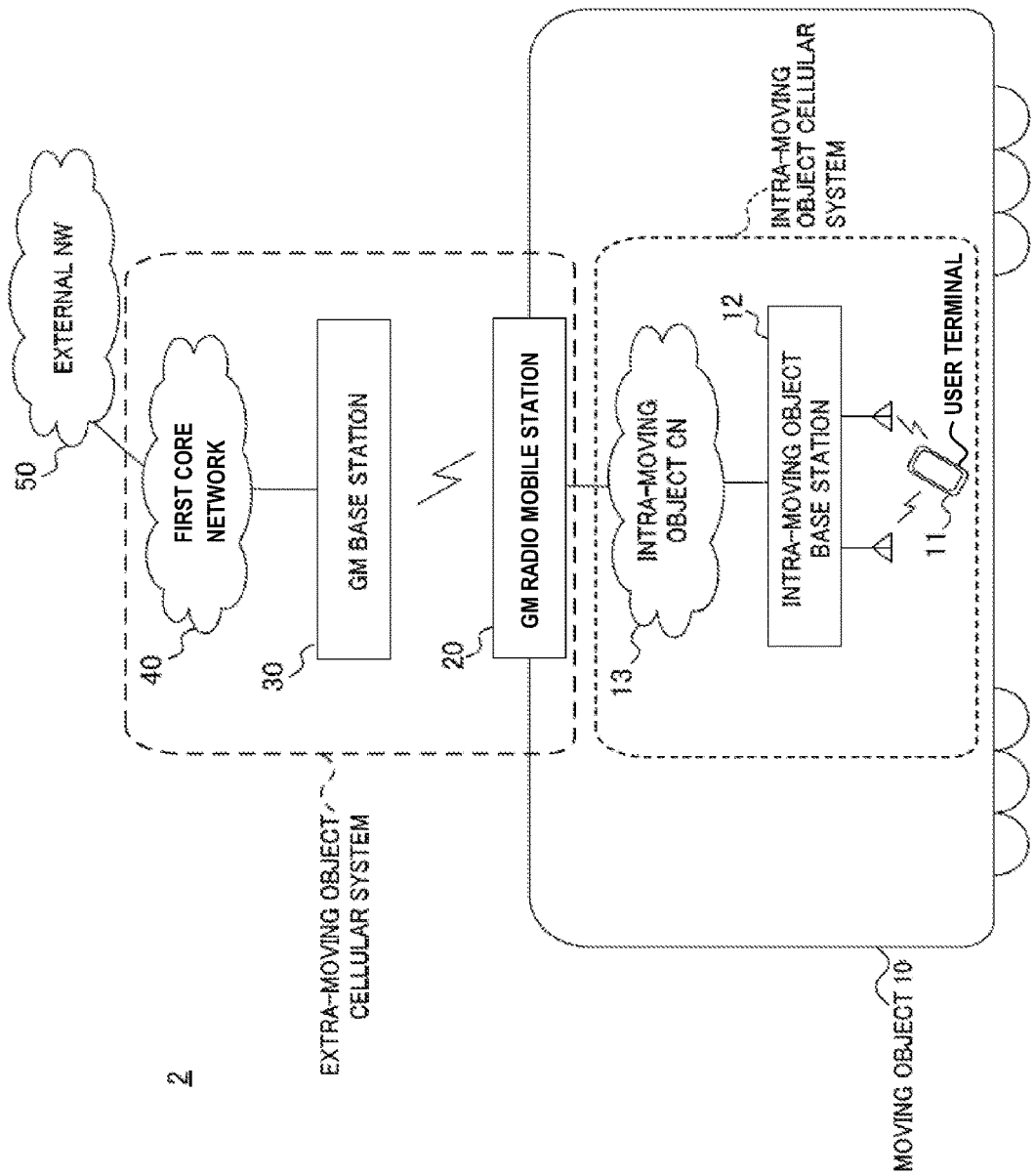
FIG. 8 is a diagram to show an overall structure of a mobile communication system according to a second embodiment.

FIG. 8 is a schematic diagram of a mobile communication system according to the second embodiment. As shown in FIG. 8, a mobile communication system 2 includes a radio mobile station (hereinafter, referred to as "GM mobile station") 20 that is provided in a moving object 10, a radio base station (hereinafter referred to as "GM base station") 30 that is placed along the path of the movement of the moving object 10, and a core network (CN) 40 that is connected to an external network (NW) 50 such as the Internet.

In the moving object 10, a user terminal 11, a radio base station (hereinafter referred to as "intra-moving object base station") 12 to form a cell C (small cell) (first radio base station), and a core network (CN) 13 that is connected with the intra-moving object base station 12 and the GM mobile station 20 (hereinafter referred to as "intra-moving object CN"). Note that the user terminal 11 is a terminal to support various communication schemes such as LTE, LTE-A and FRA.

The mobile communication system 2 is comprised of an intra-moving object cellular system, which includes the user terminal 11, the intra-moving object base station 12 and the intra-moving object CN 13, and an extra-moving object cellular system, which includes the GM mobile station 20, the GM base station 30 and the CN 40. As shown in FIG. 8, the intra-moving object cellular system and the extra-moving object cellular system are connected in series, and the interface (for example, the SGi interface) between the core networks and the external network is used between the intra-moving object CN 13, which serves as the connecting point, and the GM mobile station 20.

In the mobile communication system 2, the GM mobile station 20 manages the access control, authentication control, mobility control and so on of the user terminal 11 as a proxy. To be more specific, the intra-moving object CN 13 transmits a proxy request signal to the GM mobile station 20, and the GM mobile station 20 aggregates and manages the access control, authentication control, mobility control and so on of many user terminals 11 as a proxy. Therefore, even when many user terminals 11 in the moving object 10 perform mobile communication, it is still possible to reduce the control overhead due to handovers and the concentration of traffic, and improve the system performance.

(2.2) User/Control-Plane Communication Process

Figure 9:
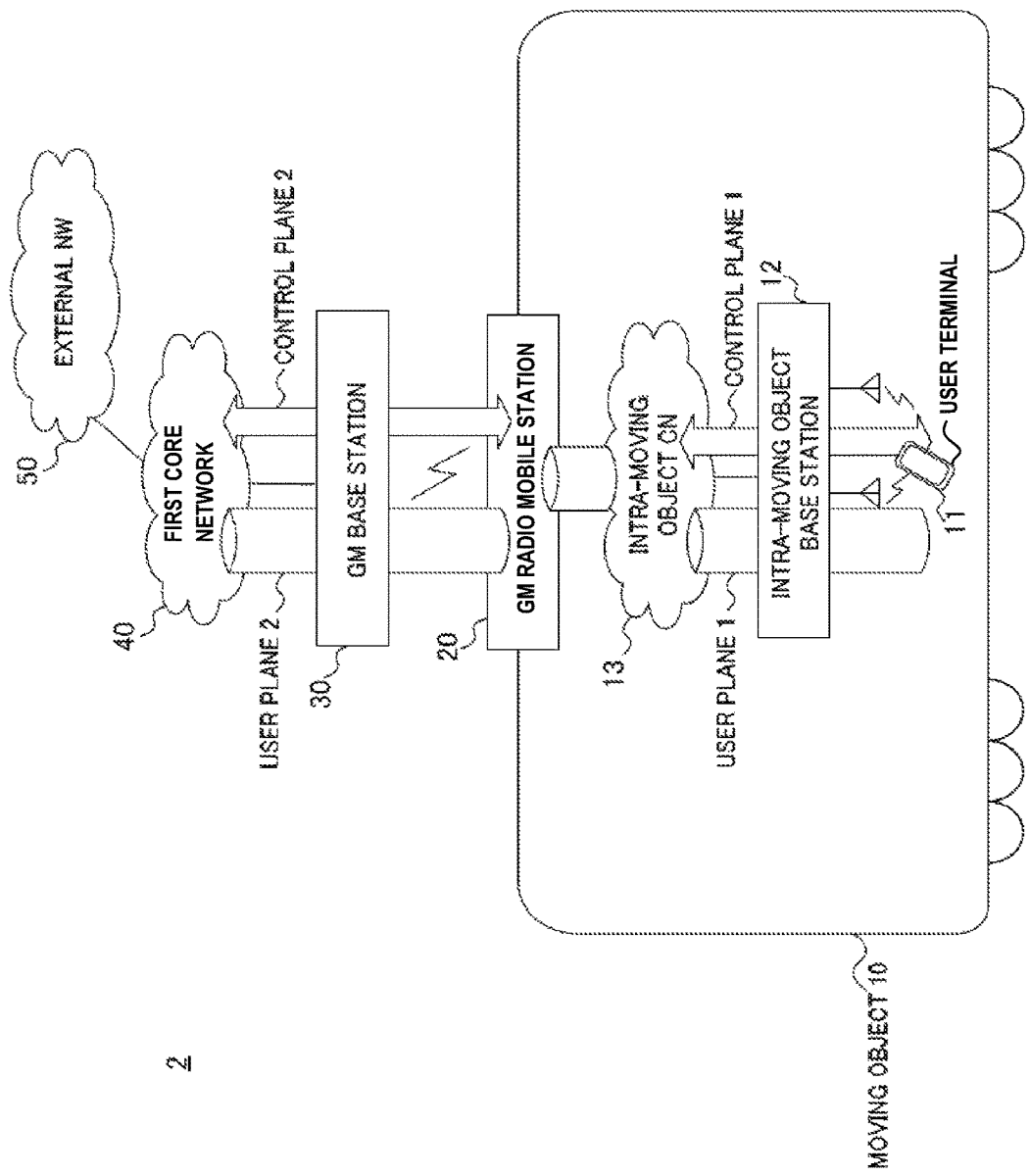
FIG. 9 is a diagram to explain the user/control-planes in mobile communication system according to the second embodiment.

Communication using user planes and control planes in the mobile communication system according to the second embodiment will be described with reference to FIG. 9 and FIG. 10. FIG. 9 is a diagram to explain the user/control planes in the mobile communication system according to the second embodiment. As shown in FIG. 9, in the mobile communication system 2, communication using the user plane 1 and communication using the control plane 1 are performed in the intra-moving object cellular system (between the user terminal 11 and the intra-moving object CN 13). In the extra-moving object cellular system (between the GM mobile station 20 and the CN 40), communication using the user plane 2 and communication using the control plane 2 are carried out.

To be more specific, in the user plane 1, uplink user data is transmitted from the user terminal 11 to the intra-moving object CN 13 via the intra-moving object base station 12. The uplink user data that is received in the intra-moving object CN 13 is relayed (forwarded) to the GM mobile station 20. The downlink user data that is relayed (forwarded) from the GM mobile station 20 is transmitted from the intra-moving object CN 13 to the user terminal 11 via the intra-moving object base station 12.

Also, in the control plane 1, control signals are transmitted and received between the user terminal 11 and the intra-moving object CN 13, between the user terminal 11 and the intra-moving object base station 12 and between the intra-moving object base station 12 and the intra-moving object CN 13. Note that the control signals (uplink/downlink control signals) include signals for use for the mobility control, initial access authentication control and so on of the user terminal 11.

In the user plane 2, uplink user data that is relayed (forwarded) from the intra-moving object CN 13 is transmitted from the GM mobile station 20 to the CN 40 via the GM base station 30. The uplink user data that is received in the CN 40 is relayed (forwarded) to the external NW 50. The downlink user data from the external NW 50 is transmitted from the CN 40 to the GM mobile station 20 via the GM base station 30.

In the control plane 2, proxy control signals are transmitted and received between the GM mobile station 20 and the CN 40, between the GM mobile station 20 and the GM base station 30 and between the GM base station 30 and the CN 40. Note that the control signals (uplink/downlink control signals) include signals for use for the mobility control, initial access authentication control and so on of the user terminal 11. The proxy control signals that are transmitted and received in the control plane 2 are control signals for aggregating and managing, as a proxy, the access control, authentication control, mobility control and so on of user terminals 11 that are connected to the intra-moving object base station 12.

Figure 10A:
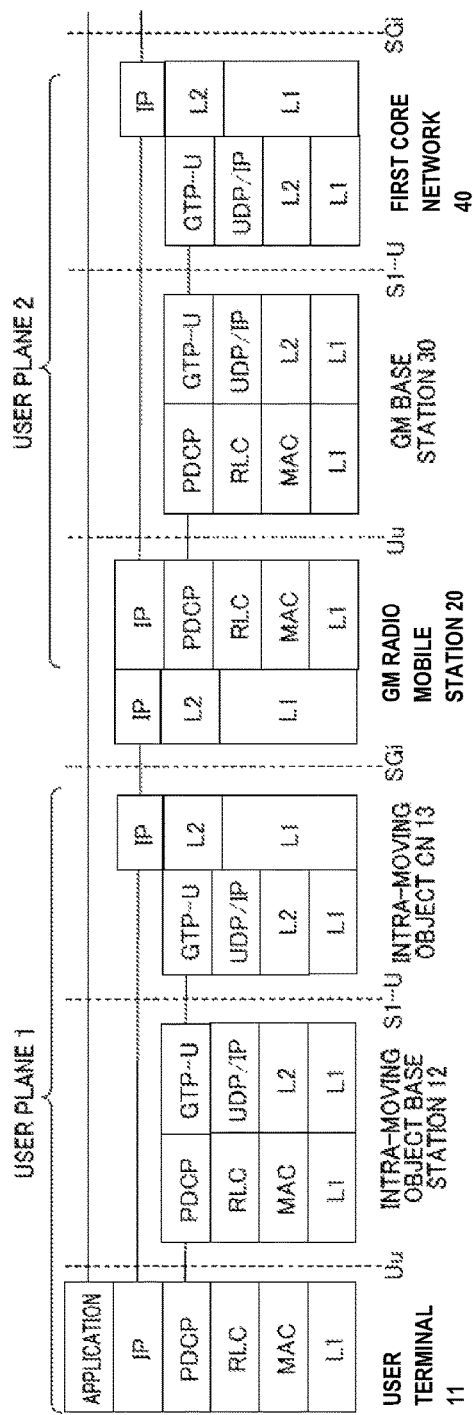
FIG. 10 provide diagrams to explain the protocol stacks in the mobile communication system according to the second embodiment.
Figure 10B:
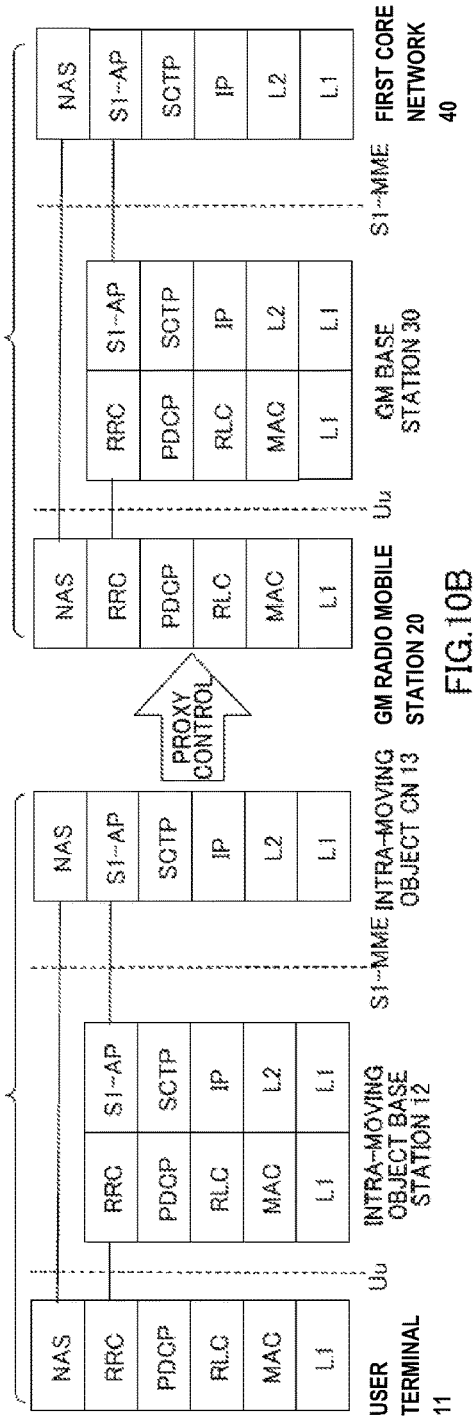

FIG. 10 provide diagrams to show examples of protocol stacks in the mobile communication system according to the second embodiment. FIG. 10A shows user-plane protocol stacks, and FIG. 10B shows control-plane protocol stacks. Note that the protocol stacks shown in FIGS. 10A and 10B are simply examples and are by no means limiting.

As shown in FIG. 10A, in user planes, the user terminal 11 and the intra-moving object base station 12 transmit and receive user data via a radio interface (referred to as "Uu interface" and so on). To be more specific, communication is carried out by using L1 (layer 1/physical layer), MAC (Medium Access Control), RLC (Radio Link Control) and PDCP (Packet Data Convergence Protocol). The intra-moving object base station 12 converts L1, MAC, RLC and PDCP data into L1, L2, UDP (User Datagram Protocol)/IP (Internet Protocol), GTP-U (GPRS Tunneling Protocol for the User plane) data.

The intra-moving object base station 12 and the intra-moving object CN 13 transmit and receive user data via a user-plane interface (referred to as the "S1-U interface" and so on) between the radio base stations and the core networks. To be more specific, communication using L1, L2, UDP/IP and GTP-U is carried out.

Although not illustrated, a plurality of gateway devices (for example, an S-GW and a P-GW) are provided in the intra-moving object CN 13. Communication using L1, L2, UDP/IP and GTP-U may be carried out between the S-GW and the P-GW (in the event of GTP S5/S8), and communication using L1, L2, IPv4/v6 (Internet Protocol version 4/version 6) and the GRE (Generic Routing Encapsulation) tunnel may be carried out between the S-GW and the P-GW (in the event of PMIP (Proxy Mobile IP) S5/S8).

The gateway device of the intra-moving object CN 13 (for example, the P-GW) converts L1, L2, UDP/IP and GTP-U data into L1, L2 and IP data (in the event of GTP S5/S8). This gateway device may convert L1, L2, IPv4/v6, GRE-tunnel and IP data into L1, L2 and IP data (in the event of PMIP S5/S8).

The gateway device of the intra-moving object CN 13 (for example, the P-GW) and the GM mobile station 20 transmit and receive user data via an interface (referred to as "SGi interface" and so on) between the core networks and an external network. To be more specific, communication using L1, L2 and IP is carried out. The GM mobile station 20 converts L1, L2 and IP data into L1, MAC, RLC, PDCP and IP data.

The GM mobile station 20 and the GM base station 30 transmit and receive user data via a radio interface (referred to as "Uu interface" and so on). To be more specific, communication using L1, MAC, RLC and PDCP is carried out, as is the case between the user terminal 11 and the intra-moving object base station 12. The GM base station 30 converts L1, MAC, RLC and PDCP data into L1, L2, UDP/IP and GTP-U data, as does the intra-moving object base station 12.

The GM base station 30 and the CN 40 transmit and receive user data via the user-plane interface (referred to as "S1-U interface" and so on) between the radio base stations and the core networks. To be more specific, communication using L1, L2, UDP/IP and GTP-U is carried out. The gateway device (for example, the P-GW) of the CN 40 converts UDP/IP, GTP-U and IP data into L1, L2 and IP data (in the event of GTP S5/S8), as does the gateway device of the intra-moving object CN 13. The gateway device of the CN 40 may convert L1, L2, IPv4/v6, GRE-tunnel and IP data into L1, L2 and IP data (in the event of PMIP S5/S8).

As shown in FIG. 10B, in the control-plane, the user terminal 11 and the intra-moving object base station 12 transmit and receive control signals via a radio interface (referred to as "Uu interface" and so on). To be more specific, communication using L1, MAC, RLC, PDCP and RRC (Radio Resource Control) is carried out. The intra-moving object base station 12 converts L1, MAC, RLC, PDCP and RRC data into L1, L2, IP, SCTP (Stream Control Transmission Protocol) and S1-AP data.

The intra-moving object base station 12 and the intra-moving object CN 13 transmit and receive control signals via the control-plane interface (referred to as "S1-MME interface" and so on) between the radio base stations and the core networks. To be more specific, communication using L1, L2, IP, SCTP and S1-AP is carried out.

Similarly, the GM mobile station 20 and the GM base station 30 transmit and receive control signals via a radio interface (referred to as "Uu interface" and so on). To be more specific, communication using L1, MAC, RLC, PDCP and RRC is carried out. The intra-moving object base station 12 converts L1, MAC, RLC, PDCP and RRC data into L1, L2, IP, SCTP and S1-AP data.

The GM base station 30 and the CN 40 transmit and receive control signals (proxy control signals) via the control-plane interface (referred to as the "S1-MME interface" and so on) between the radio base stations and the core networks. To be more specific, communication using L1, L2, IP, SCTP and S1-AP is carried out.

(2.3) Structure of Each Device

Figure 11:
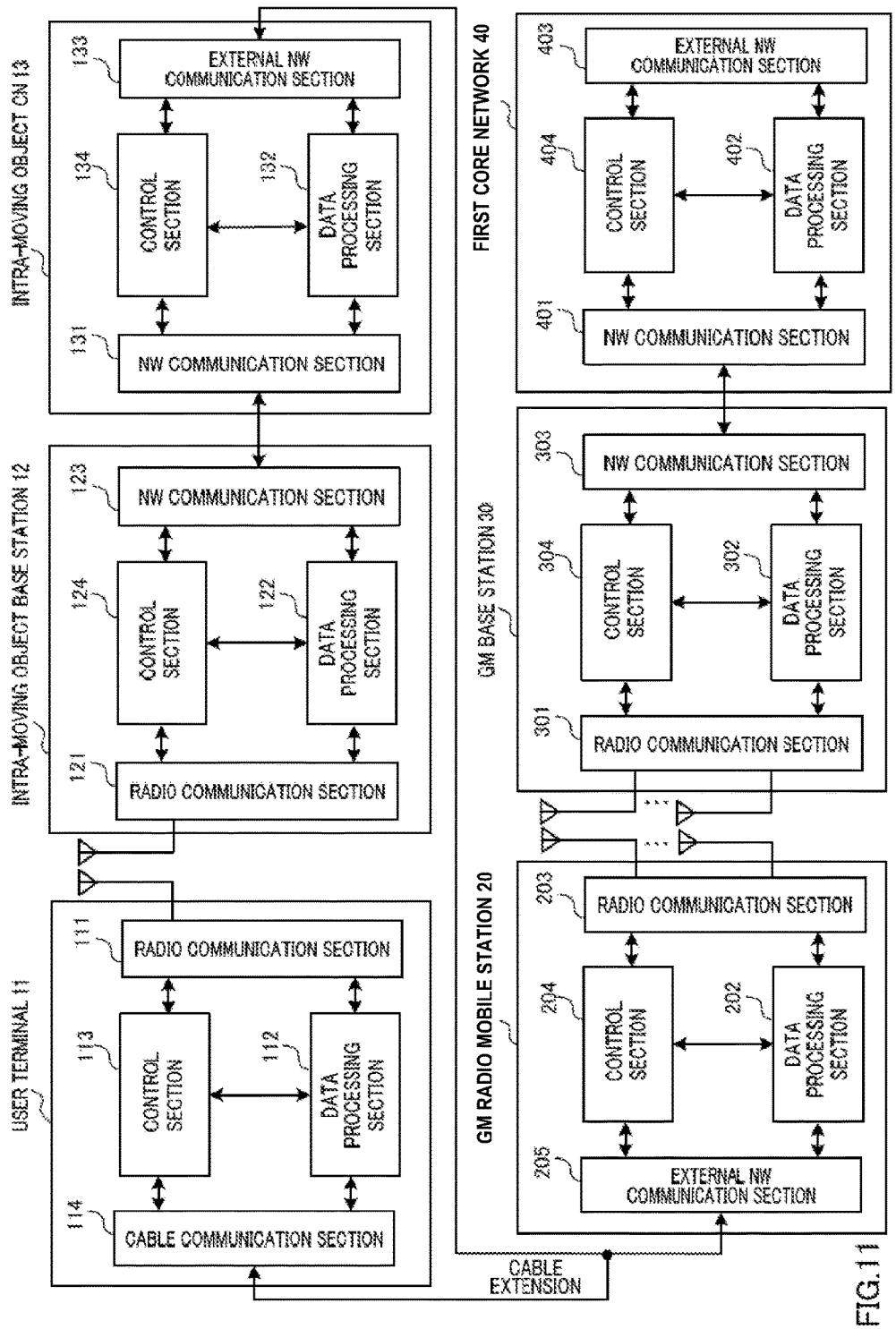
FIG. 11 is a diagram to show a detailed structure of the mobile communication system according to the second embodiment.

The structure of each device in the mobile communication system according to the second embodiment will be described with reference to FIG. 11. FIG. 11 is a diagram to show the structure of each device in the mobile communication system according to the second embodiment. Note that each device shown FIG. 11 has hardware including a processor, a memory, an RF (Radio Frequency) circuit, an antenna, a display, a user interface, and a software module to be executed by the processor is stored in the memory. Each device structure may be implemented by the above-noted hardware, may be implemented by the software module that is executed by the processor, or may be implemented by the combination of both.

(2.3.1) Structure of User Terminal 11

As shown in FIG. 11, a user terminal 11 has a radio communication section 111, a data processing section 112, a control section 113 and a cable communication section 114. Note that the cable communication section 114 may be omitted.

The radio communication section 111 transmits and receives user data of the user plane 1, control signals of the user plane 1 and so on, with the intra-moving object base station 12, via a radio interface (for example, the Uu interface). For example, the radio communication section 111 may communicate by using L1 (see FIGS. 10A and 10B). Note that the radio communication section 111 may carry out radio communication with macro base stations and small base stations provided outside the moving object 10.

The data processing section 112 performs data processing of the radio interface (for example, the Uu interface). For example, the data processing section 112 performs data processing of user data by using MAC, RLC, PDCP, IP and the application protocol (see FIG. 10A). The data processing section 112 performs data processing of control signals by using L1, MAC, RLC, PDCP, RRC and NAS (Non-Access Stratum) (see FIG. 10B). Note that the control signals include signals for use for the mobility control, initial access authentication control and so on of the user terminal 11.

The control section 113 controls the radio communication section 111, the data processing section 112 and the cable communication section 114. The control section 113 may execute NAS control with respect to the CN 40, or execute RRC control with respect to the intra-moving object base station 12.

The cable communication section 114 transmits and receives user data with the GM mobile station 20 by using a cable that extends from the GM mobile station 20. The GM mobile station 20 uses the same protocol stack as that of the user terminal 11 (see FIG. 10A). Consequently, the cable communication section 114 can transmit and receive user data with the GM mobile station 20 without involving an intra-moving object base station 12 and an intra-moving object CN 13, which will be described later.

(2.3.2) Structure of Intra-Moving Object Base Station

As shown in FIG. 11, the intra-moving object base station 12 has a radio communication section 121, a data processing section 122, a network (NW) communication section 123 and a control section 124.

The radio communication section 121 transmits and receives user data of the user plane 1, control signals of the user plane 1 and so on, with the user terminal 11, via a radio interface (for example, the Uu interface). For example, the radio communication section 121 may communicate by using L1 (see FIGS. 10A and 10B).

The data processing section 122 performs data processing of the radio interface (for example, the Uu interface) and the user/control-plane interfaces (for example, the S1-U/S1-MME interfaces) between the radio base stations and the core networks. For example, the data processing section 122 may perform the conversion process of MAC, RLC and PDCP user data and L1, L2, UDP/IP and GTP-U user data (see FIG. 10A). The data processing section 122 may perform the conversion process of MAC, RLC, PDCP and RRC control signals and L2, IP, SCTP and S1-AP control signals (see FIG. 10B).

The NW communication section 123 transmits and receives user data of the user plane 1, control signals of the control plane 1 and so on, with the intra-moving object CN 13, via the user/control-plane interfaces (for example, the S1-U/S1-MME interfaces) between the radio base stations and the core networks.

The control section 124 controls the radio communication section 121, the data processing section 122 and the NW communication section 123. The control section 124 may execute RRC control with respect to the user terminal 11, or execute S1-AP control with respect to the intra-moving object CN 13. In this case, RRC and S1-AP need not be subjected to conversion in the data processing section 122. The control section 124 may transmit a proxy request signal via the NW communication section 123. The proxy request signal is a signal to request the GM mobile station 20 to carry out control-plane communication of a plurality of user terminals 11 (for example, handover control, mobility management, etc.) all together as a proxy.

(2.3.3) Structure of Intra-Moving Object CN

As shown in FIG. 11, the intra-moving object CN 13 has a network (NW) communication section 131, a data processing section 132, an external network (NW) communication section 133 and a control section 134. Note that the following structure of the intra-moving object CN 13 has only to be constituted with at least one of the S-GW, the P-GW and the MME that are provided in the CN 60.

The NW communication section 131 transmits and receives user data of the user plane 1, control signals of the control plane 1 and so on, with the intra-moving object base station 12, via the user/control-plane interfaces (for example, the S1-U/S1-MME interfaces) between the radio base stations and the core networks.

The data processing section 132 performs data processing of the user/control-plane interfaces (for example, the S1-U/S1-MME interfaces) between the radio base stations and the core networks and the interface (for example, the SGi interface) with the external network. For example, the data processing section 132 may perform the conversion process of L1, L2, UDP/IP and GTP-U user data and L1, L2, IP user data (see FIG. 10A). The data processing section 132 may perform data processing of L1, L2, IP, SCTP, S1-AP and NAS control signals (see FIG. 10B).

The external NW communication section 133 transmits and receives user data with the GM mobile station 20 via the interface (for example, the SGi interface) between the core networks and the external network. The external NW communication section 133 transmits a proxy request signal for the GM mobile station 20 to the GM mobile station 20.

The control section 134 controls the NW communication section 131, the data processing section 132 and the external NW communication section 133. The control section 134 may execute NAS control with respect to the user terminal 11, or execute S1-AP control with respect to the intra-moving object base station 12. The control section 134 may transmit a proxy request signal via the external NW communication section 133. The proxy request signal may be controlled by the intra-moving object base station 12 to be transmitted to the GM mobile station 20.

(2.3.4) Structure of GM Mobile Station 20

As shown in FIG. 11, the GM mobile station 20 has an external network (NW) communication section 205, a data processing section 202, a radio communication section 203 and a control section 204.

The external NW communication section 205 transmits and receives user data with the intra-moving object CN 13 via the interface (for example, the SGi interface) between the core networks and the external network. The external NW communication section 205 receives proxy request signals from the intra-moving object base station 12 and the intra-moving object CN 13, and outputs these to the control section 204.

The data processing section 202 performs data processing of the interface (for example, the SGi interface) between the core networks and the external network and the radio interface (for example, the Uu interface). For example, the data processing section 202 may perform the conversion process of L1, L2 and IP data and L1, MAC, RLC, PDCP and IP data (see FIG. 10A). The data processing section 202 may process L1, L2, IP, SCTP, S1-AP and NAS data (see FIG. 10B).

The radio communication section 203 transmits and receives user data of the user plane 2 and control signals of the control plane 2 (proxy control signals) with the GM base station 30 via a radio interface (for example, the Uu interface). For example, the radio communication section 203 may communicate by using L1 (see FIGS. 10A and 10B).

The radio communication section 203 may carry out radio communication with the GM base station 30 by using beamforming. When the radio communication section 203 holds many antenna elements, it is possible to execute even more reliable beamforming with massive MIMO. By means of beamforming, it is possible to improve the quality of communication between the GM mobile station 20 and the GM base station 30.

The control section 204 controls the external NW communication section 205, the data processing section 202 and the radio communication section 203. The control section 204 may execute NAS control with respect to the CN 40, or execute RRC control with respect to the GM base station 30. The control section 204 manages the access control, authentication control and mobility control and so on of the user terminal 11, as a proxy, in response to proxy request signals from the intra-moving object base station 12, the intra-moving object CN 13 and so on.

(2.3.5) Structure of GM Base Station 30

As shown in FIG. 11, the GM base station 30 has a radio communication section 301, a data processing section 302, a network (NW) communication section 303 and a control section 304.

The radio communication section 301 transmits and receives user data of the user plane 2 and control signals of the control plane 2 (proxy control signals), with the GM mobile station 20, via a radio interface (for example, the Uu interface). For example, the radio communication section 301 may communicate by using L1 (see FIGS. 10A and 10B).

The radio communication section 301 may carry out radio communication with the GM mobile station 20 by using beamforming. When the radio communication section 301 holds many antenna elements, it is possible to execute even more reliable beamforming with massive MIMO. By means of beamforming, it is possible to improve the quality of communication between the GM mobile station 20 and the GM base station 30.

The data processing section 302 performs data processing of the radio interface (for example, the Uu interface) and the user/control-plane interfaces (for example, the S1-U/S1-MME interfaces) between the radio base stations and the core networks. For example, the data processing section 302 may perform the conversion process of L1, MAC, RLC, PDCP and IP data and L1, L2, UDP/IP and GTP-U data (see FIG. 10A). The data processing unit 302 may perform the conversion process of L1, MAC, RLC, PDCP and RRC data and L1, L2, IP, SCTP and S1-AP data (see FIG. 10B).

The NW communication section 303 transmits and receives user data of the user plane 2 and control signals of the control plane 2 (proxy control signals) with the CN 40 via the user/control-plane interfaces (for example, the S1-U/S1-MME interfaces) between the radio base stations and the core networks.

The control section 304 controls the radio communication section 301, the data processing section 302 and the NW communication section 303. The control section 304 may execute RRC control with respect to the GM mobile station 20, or execute S1-AP control with respect to the CN 40. In this case, RRC and S1-AP need not be subjected to conversion in the data processing section 302.

(2.3.6) Structure of CN 40

As shown in FIG. 11, the CN 40 has a network (NW) communication section 401, a data processing section 402, an external network (NW) communication section 403 and a control section 404. Note that the following structure of the CN 40 has only to be constituted with at least one of the S-GW, the P-GW and the MME that are provided in the CN 40.

The NW communication section 401 transmits and receives user data of the user plane 2 and control signals of the control plane 2 (proxy control signals) with the GM base station 30 via the user/control-plane interfaces (for example, the S1-U/S1-MME interfaces and so on) between the radio base stations and the core networks.

The data processing section 402 performs data processing of the interface (for example, the SGi interface) between the core networks and the external network. For example, the data processing section 402 may perform conversion process of L1, L2, UDP/IP and GTP-U data and L1, L2 and IP data (see FIG. 10A). Also, the data processing section 402 may process L1, L2, IP, SCTP, S1-AP and NAS data (see FIG. 10B).

The external NW communication section 403 communicates with the external NW 50 via the interface between the core networks and the external network (the SGi interface and so on).

The control section 404 controls the NW communication section 401, the data processing section 402 and the external NW communication section 403. Also, the control section 404 may execute NAS control with respect to the GM mobile station 20, or execute S1-AP control with respect to the GM base station 30.

In this way, the mobile communication system according to the second embodiment is a mobile communication system, which includes an intra-moving object cellular system (first communication system) featuring a user terminal 11 that is present in the moving object 10, an intra-moving object base station 12 (first radio base station) that forms a cell within the moving object 10, and an intra-moving object CN 13 (first core network) that is connected with the intra-moving object base station 12, and an extra-moving object cellular system (first communication system) featuring a GM mobile station 20 (radio mobile station) that is provided in the moving object 10, a GM base station 30 (second radio base station) that form cells on the path of the movement of the moving object 10, and a CN 40 (second core network) that is connected to the GM base station 30 and an external network, and in which the intra-moving object CN 13 and the GM mobile station 20 are connected via interfaces between the core networks and the external network.

(2.4) Working Effect

As described above, in the mobile communication system according to the second embodiment, an intra-moving object cellular system and an extra-moving object cellular system are connected in parallel (see FIG. 8), and the interface (for example, the SGi interface) between core networks and an external network is used between an intra-moving object CN 13, which serves as the connecting point, and a GM mobile station 20.

The GM mobile station 20 manages the access control, authentication control, mobility control and so on of the user terminal 11 as a proxy. Therefore, even when many user terminals 11 in a moving object 10 perform mobile communication, it is still possible to reduce the control overhead due to handovers and the concentration of traffic, and improve the system performance.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2013-255501, filed on Dec. 10, 2013, including the specification, drawings and abstract, is incorporated herein by reference in its entirety.

The invention claimed is:

1. A mobile communication system comprising:
a first communication system, which includes:
a user terminal that is present in a moving object;
a first radio base station connected to the user terminal via a first radio interface; and
a first core network that is connected to an external network; and
a second communication system, which includes:
a radio Group Mobility (GM) mobile station that is provided in the moving object;
a second radio base station connected to the GM mobile station via a second radio interface; and
a second core network that is connected to the second radio base station and the first core network,
wherein lower layer data of user data that is transmitted and received on a first user plane between the user terminal and the first core network, and lower layer data of control signals that are transmitted and received on a control plane between the user terminal and the first core network, are transmitted and received on a second user plane that is provided between the GM mobile station and the second core network.

2. The mobile communication system according to claim 1, wherein:
the user terminal and the first radio base station transmit and receive the user data and the control signals via the first radio interface.

3. The mobile communication system according to claim 2, wherein:
the GM mobile station and the external radio base station transmit and receive the user data that is formed with the lower layer data of the user data and the control signals via the second radio interface.

4. The mobile communication system according to claim 2, wherein control signals in the second communication system are transmitted and received in the second control plane that is provided between the GM mobile station and the second core network.

5. The mobile communication system according to claim 2, wherein the lower layer data is L1 (layer 1) and L2 (layer 2) data.

6. The mobile communication system according to claim 1, wherein:
the first and second user-plane interfaces are S1-U interfaces; and
the first and second control-plane interfaces are S1-MME interfaces.

7. The mobile communication system according to claim 3, wherein control signals in the second communication system are transmitted and received in the second control plane that is provided between the GM mobile station and the second core network.

8. The mobile communication system according to claim 3, wherein the lower layer data is L1 (layer 1) and L2 (layer 2) data.

9. The mobile communication system according to claim 2, wherein:
the first and second user-plane interfaces are S1-U interfaces; and
the first and second control-plane interfaces are S1-MME interfaces.

10. The mobile communication system according to claim 3, wherein:
the first and second user-plane interfaces are is an S1-U interfaces; and
the first and second control-plane interfaces are S1-MME interfaces.

11. A first radio base station that forms a cell in a moving object, the first radio base station comprising:
a transceiver that:
transmits and receives user data and control signals with a user terminal that is present in the moving object via a radio interface; and
transmits and receives lower layer data of the user data with a Group Mobility (GM) mobile station provided in the moving object via a first user-plane interface and transmits and receives lower layer data of the control signals via a first control-plane interface; and
a processor that performs data processing between the first radio interface and the first user-plane interface and the first control-plane interface,
wherein the lower layer data of the user data and the lower layer data of the control signals are transmitted and received on a second user plane that is provided between the GM mobile station and a second core network connected to a first core network and the second radio base station connected to the GM mobile station via a second radio interface.

12. A Group Mobility (GM) mobile station that is provided in a moving object, the GM mobile station comprising:
a processor with a memory; and
a transceiver coupled to the processor,
wherein the processor causes the transceiver to:
transmit and receive, with a first radio base station, lower layer data of user data that is transmitted and received between the first radio base station that forms a cell in a moving object, and a user terminal that is present in the moving object, via a first user-plane interface between the radio base station and a core network, and transmits and receives lower layer data of control signals that are transmitted and received between the first radio base station and the user terminal via a first control-plane interface between the radio base station and the core network; and
transmit and receive user data that is formed with the lower layer data of the user data and the control signals, with a second radio base station connected to the GM mobile station via a second radio interface, via a second radio interface, and
wherein lower layer data of the user data and lower layer data of the control signals are transmitted and received on a second user plane that is provided between the GM mobile station and a second core network connected to the second radio base station and the first core network.

13. A mobile communication method in a mobile communication system comprising a first communication system, which includes a user terminal that is present in a moving object, a first radio base station connected to the user terminal via a first radio interface, and a first core network that is connected to an external network, and a second communication system, which includes a Group Mobility (GM) mobile station that is provided in the moving object, a second radio base station connected to the GM mobile station via a second radio interface, and a second core network that is connected to the second radio base station and the first core network, the mobile communication method comprising:
transmitting and receiving, by the user terminal and the first radio base station, user data and control signals via the first radio interface; and
transmitting and receiving, by the first radio base station and the GM mobile station, lower layer data of the user data via a first user-plane interface, and transmitting and receiving, by the first radio base station and the GM mobile station, lower layer data of the control signals via a control-plane interface
wherein lower layer data of the user data and lower layer data of the control signals are transmitted and received on a second user plane that is provided between the GM mobile station and the second core network.

* * * * *